Patented Sept. 5, 1922.

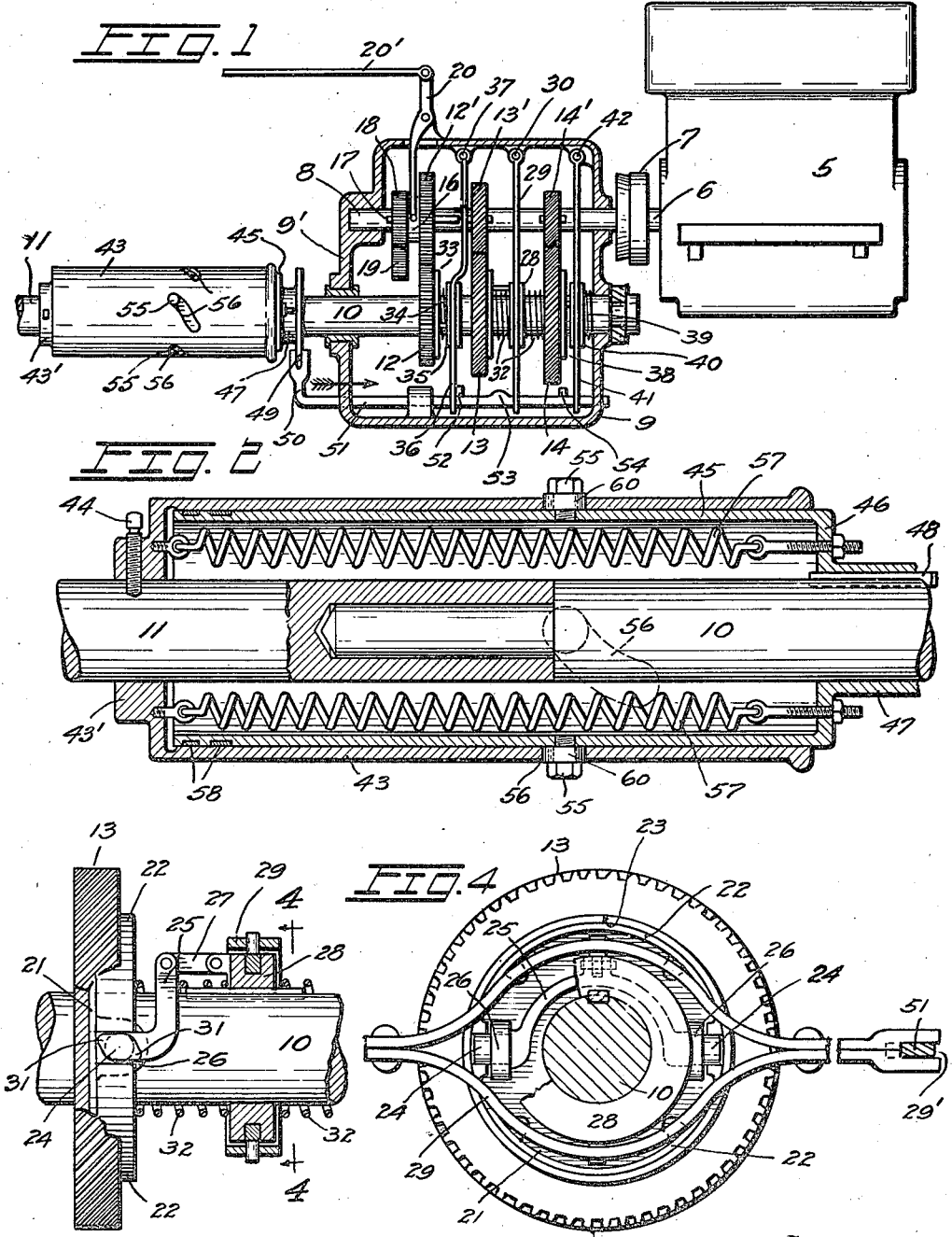

1,428,326

UNITED STATES PATENT OFFICE.

JOSEPH G. FAY, OF SEATTLE, WASHINGTON, ASSIGNOR OF EIGHT PER CENT TO JOHN K. McDOWELL AND EIGHT PER CENT TO NEMER F. NAHHAS, BOTH OF SEATTLE, WASHINGTON.

CHANGE-SPEED GEARING.

Application filed September 4, 1920. Serial No. 408,333.

*To all whom it may concern:*

Be it known that I, JOSEPH G. FAY, a citizen of the United States, residing at Seattle, in the county of King and State of Washington, have invented certain new and useful Improvements in Change-Speed Gearing, of which the following is a specification.

This invention relates to power transmission gearing for motor vehicles. The object of my improvements is to provide automatically regulated means for transmitting from a driving shaft, operating at a constant or variable speed, motion to a driven shaft suitable to furnish the requisite power to propel a vehicle at different speeds and under variable load conditions.

The invention consists in the novel construction, adaptation and combination of parts as will be hereinafter described and claimed.

In the accompanying drawings, Figure 1 is a side elevational view, partly in vertical section, of a transmission mechanism of a motor vehicle illustrating an embodiment of my invention; Fig. 2 is a longitudinal sectional view of the controlling drum shown in Fig. 1; Fig. 3 is a detail elevational view, with parts in section, of the intermediate speed gear and the clutch mechanism therefor; and Fig. 4 is a sectional view through 4—4 of Fig. 3, parts being broken away.

In said drawings, the reference numeral 5 represents an internal combustion engine having its shaft 6 releasably connected by means of a clutch 7 with a shaft 8, hereinafter designated as the "driving" shaft, which extends into a gear box 9. The clutch 7 is, or may be, of the usual type employed on automobiles and is arranged to have its members disengaged by any suitable means (not shown) under the control of the operator.

Also provided in said gear box and in parallel relations with the driving shaft 8 is a driven shaft 10 which extends through the rear wall $9^1$ of said gear box. In axial alignment with said driven shaft is a propeller shaft 11 by which the traction wheels of the car are driven through the medium of the differential gearing, etc., in any well known or suitable manner. Mounted in spaced relations with each other upon the driven shaft 10 and adapted to normally rotate independently thereof are toothed gears 12, 13 and 14, of which the gear 12 is desirably of the spur type and the other two gears of the so called spiral type. Meshing with the gear 12 is a spur pinion $12^1$ which is secured to or formed integral with a sleeve 16 which is mounted upon the driving shaft 8 and arranged for axial movements thereon as by the provision of a spline 17. Carried by the sleeve 16 is a second spur pinion 18 in continuous mesh with an idler gear 19, which, for the purpose of reversing the driven shaft 10, is engageable with the driven gear 12 by shifting the sleeve through the medium of a forked lever 20 and an operating rod $20^1$ which is manually controlled by the operator.

Keyed or otherwise secured upon the driving shaft 8 and in continuous mesh with the aforesaid gears 13 and 14 are pinions $13^1$ and $14^1$. The gears 12, 13, and 14 are of sizes proportional to the associated pinions to respectively afford high, intermediate and low speeds to the driven shaft 10. For each of the gears 12, 13 and 14 is provided clutch mechanism for releasably coupling the same to the driven shaft.

Said clutches are preferably of the friction variety, whereof the gears are recessed to serve as the female members.

Referring particularly to Figs. 3 and 4, showing the clutch for the intermediate gear 13, 21 represents a disk element keyed to shaft 10 and carrying within the gear recess two arcuate clutch-shoes 22 which are arranged to be relatively expanded into engagement with the peripheral wall 23 of the gear recess. To which end I provide in the spaces between the adjacent ends of said shoes, cam elements 24 formed upon the ends of a crank lever 25 which is fulcrumed in the disk lugs 26. This lever, as shown, is connected by a link 27 with a collar 28 which is splined to said driven shaft so as to be shiftable endwise thereof by means of a lever 29 which, as shown in Fig. 1, is fulcrumed at 30 to a lug depending from the top of the gear box. The cam elements 24 of the clutch above described for the intermediate gear 13 are each provided at diametrically opposite sides with projections, such as 31, in order that the shoes may be forced apart to engage the gear when the collar 28 is moved in either direction axially of the shaft 10.

This collar, however, is yieldingly retained by springs 32 in a position to normally render the cams 24 inoperative, but by shifting it in either axial direction from such neutral position the cams effect the clutching of the gear. The clutches for high and low speed gears 12 and 14 are similar to that above described. For the intermediate gear 13 except with these each of the cams is provided with a single projection and, in consequence, the clutches are engaged by a movement of the respective collar in one axial direction only and disengaged by a movement of the collar in the opposite direction.

With respect to high speed gear 12, the male member of the clutch is designated generally, by 33, which is normally held in couple with the gear by a spring 34, acting in cooperation with the shifting bar 51 as will be presently explained, and is disengaged by shifting the associated collar 35 by such spring when permitted by a lever 36 which is fulcrumed at 37. The gear 14 for low speed has its male member designated, generally, by 38 which is normally held out of engagement by means of a spring 39 acting against collar 40 and is coupled with the low gear through the medium of a shifting lever 41 which is fulcrumed at 42.

From the foregoing description, it is to be noted that the clutch for the high speed gear is influenced by its spring 34 to releasably retain the latter in engaged relations with the driven shaft 10; but the springs 32 and 39 respectively serve to yieldingly retain the clutches for the intermediate and low speed gears 13 and 14 in disengaged relations with such shaft.

Referring now to Figs. 1 and 2, 43 represents a cylindrical casing having one end 43¹ thereof fitted upon the propeller shaft 11 and to which the casing is rigidly secured as by means of a set screw 44. Extending telescopically into the open end of the casing 43 is a shell 45 having a closed end 46 from which extends a sleeve element 47 fitted to the driven shaft 10 and connected thereto for axial movements by means of a spline 48. Said casing and shell constitute a controller for imparting motion to the aforesaid shifting bar 51 whereby speed changes are effected.

At or near the outer end of the shell's sleeve element 47, the same is provided with a peripheral flange 49 which revolves in a slot provided in an arm 50 of a shifter bar 51 mounted for reciprocatory motion in guide ways provided in the gear box 9 through which the bar extends. The bar 51 within the gear box is provided with spaced protuberances 52, 53 and 54 disposed in substantially the relations in which they are illustrated in Fig. 1. The protuberances 52 and 54 may be in the nature of studs located so that, when the bar 51 occupies the position in which it is represented, the stud 52 is juxtaposed with the lever 36 and the high speed gear 12 is coupled with the driven shaft, and the stud 54 is located at a distance from the respective lever 41 and is temporarily inoperative. The protuberance 53 is preferably in the form of a cam of an arcuate shape and is adapted when passing in either direction of the bar's travel through a slot 29¹ of lever 29 to engage this lever to shift the collar 28 whereby the clutch for the intermediate gear 13 is caused to couple the same to the driven shaft 10.

Pins or bolts 55 extend radially from the shell 45 through spiral slots 56 provided in the circumferential wall of the casing 43 and are arranged in such a manner that rotation of the shell with the driven shaft 10 in a direction suitable to propel the vehicle forward will tend to cause the pins 55 to travel in the slots toward the forward ends of the same.

Provided interiorly of the shell and connected to the opposing ends of the shell and casing is a plurality of helical springs, such as 57, which act to contract the controller to be as represented in Figs. 1 and 2, with the pins 55 at the rear ends of the respective slots. Packing rings 58, Fig. 2, are provided in the outer periphery of the shell member and bear against the inner periphery of the casing member to render the chamber of the controller practically non-leakable in order that the air or other fluid which may be utilized therein will cooperate with the external atmospheric pressure to render the elongation of the controller less abrupt.

The pins 55 may, if desired, have mounted thereon antifriction rollers 60.

Normally the various parts occupy the relative positions shown in Figs. 1 and 2, and assuming the engine 5 is in operation it will run idly until the clutch 7 is coupled, and the driving shaft 8 serves to rotate the pinions thereon. The high speed gear 12 being engaged by the clutch mechanism thereof with the driven shaft 10 causes the latter to be rotated at high speed together with the controller shell member 45.

The inertia of the load or vehicle when at rest acts through the propeller shaft 11 thereby opposing the rotation of controller casing member 43 whereupon the revolving pins 55 are caused by the guide slots therefor in the casing member to project the shell member 45 forwardly in opposition to the springs 57.

When such forward movement occurs to the shell member the shifter bar 51 is urged forwardly thereby in the direction of the arrow in Fig. 1. When said bar is sufficiently moved the lever 36 is released with the consequent disengagement of the high speed gear 12 from the driven shaft, the bar protuberance 53 acts in the continued movement of said bar to cause the lever 29 to engage the clutch for the intermediate gear 13 thereby putting such gear in operation with a lessening of the rate of rotation of shaft 10 with an increase in the effective power of the same. Should such power be insufficient to cause the casing member 43 to rotate, the shell member 43 and shifting bar 51 are still further advanced in the direction of the arrow successively causing the protuberance 53 to become disengaged from lever 29 and the engaging of the stud 54 with the lever 41 to cause the clutch for the low speed gear 14 to couple the latter to the shaft for driving the same at the lowest speed.

As this is effected the pins 55 positively engage against the forward ends of the respective casing slots and the vehicle is accordingly started under "low-gear."

After thus starting, the inertia of motion of the traction wheels and their connections with the casing member gradually increases, thereby enabling the springs 57 to assert their power to contract the controller 43—45 with a consequent movement of the shifting bar 51 in a direction opposite to that indicated by the arrow in Fig. 1, whereby the low gear 14 is first released, intermediate gear 13 successively engaged and released and the high gear 12 ultimately engaged with the shaft 10. From the foregoing, it will be understood that the engagement and disengagement of the various speed gears is performed progressively and respectively to the load or work to which the driven or casing member 43 of the controller is subjected. When the work increases or decreases, as in the driving of the vehicle, the controller automatically serves to suitably regulate the speed of the driven shaft 10 to accommodate the same with an absence of excessive strains to a vehicle's driving or propelling mechanism.

What I claim, is,—

1. The combination of a driving shaft, a driven shaft, a plurality of speed changing gears adapted to successively connect said shafts, a third shaft, a controller having two telescopic members respectively mounted upon the driven and third named shafts, said members being provided with interfitting elements to afford relative rotary and axial movements thereto, springs operatively connected to both of the controller members, and means cooperating with said springs and operatively connected with said gears to thereby regulate the speed of the driven shaft for driving said third shaft.

2. In apparatus of the character described, the combination with change speed mechanism including a driven shaft, and a propeller shaft disposed in axial alignment with the driven shaft, of a controller comprising a cylindrical member fixedly secured to said driven member, a second cylindrical member having telescopic connection with the first named member and splined to said propeller shaft, said members being connected with each other for relative rotary and axial movements a spring connected to both of said members for yieldingly retaining the controller in its contracted condition, and means connected to the second named member for regulating said mechanism to afford various speed changes thereof according to the duty of said propeller shaft.

3. In apparatus of the character described, the combination with change speed mechanism including a driven shaft, and a propeller shaft of a controller comprising two interfitting telescopic tubular members connected to the respective shafts to rotate therewith, said members being closed at opposite ends of the controller to provide a fluid containing chamber within the latter, a spring yieldingly connecting said members together with said chamber, and means actuated by relative longitudinal movements of the controller members to regulate said mechanism to afford various changes of speed to the said shafts.

Signed at Seattle Washington, this 27th day of August, 1920.

JOSEPH G. FAY.

Witnesses:
PIERRE BARNES,
MARGARET G. SUPPLE.